Aug. 13, 1963  J. W. BARTH  3,100,372
REEL TYPE LAWN MOWER WITH CATCHER
Original Filed June 12, 1961
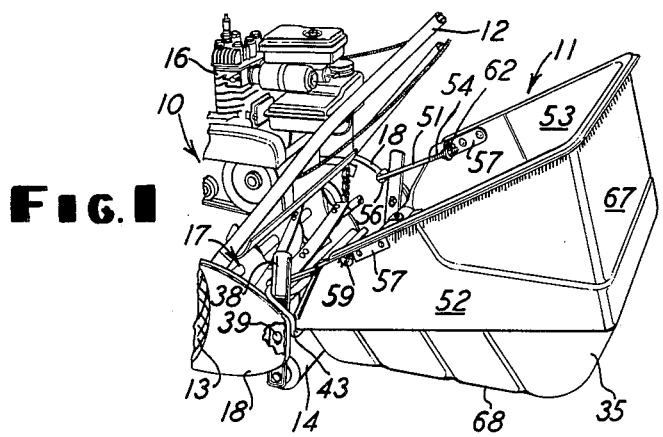
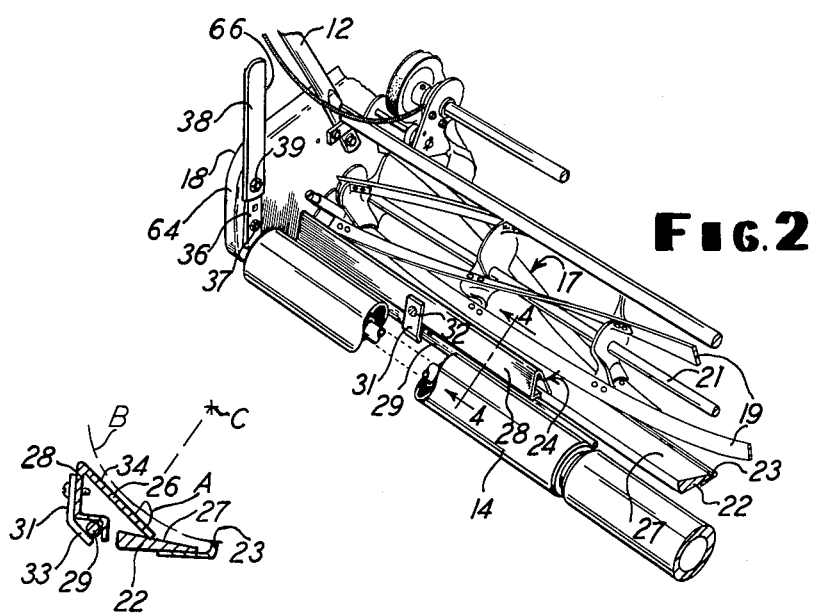
INVENTOR.
JOHN W. BARTH
BY:
*Arthur J. Hansmann*
ATTORNEY

United States Patent Office 3,100,372
Patented Aug. 13, 1963

3,100,372
REEL TYPE LAWN MOWER WITH CATCHER
John W. Barth, Cudahy, Wis., assignor to Jacobsen Manufacturing Co., Racine, Wis., a corporation of Wisconsin
Original application June 12, 1961, Ser. No. 116,458. Divided and this application May 16, 1962, Ser. No. 195,228
6 Claims. (Cl. 56—199)

This invention relates to a lawn mower, and more particularly it relates to a lawn mower of the reel type with a rear mounted grass catcher thereon. This is a division of application Serial No. 116,458, filed June 12, 1961.

It is a general object of this invention to provide the lawn mower and grass catcher in an arrangement whereby a maximum number of grass clippings can be stored and carried in the catcher. In accomplishing this particular object, the mower and the catcher cooperate in a manner that the clippings are placed into the catcher for the maximum capacity mentioned.

Still another and specific object of this invention is to provide a reel type lawn mower wherein the grass clippings can be thrown at a high trajectory so that they will be caught in the catcher at the most advantageous location for maximum filling of the catcher.

A more specific object of this invention is to provide a bed plate for a reel type lawn mower wherein the clippings which are thrown toward the left of the mower with respect to facing the forward direction of movement and with these clippings being so thrown because of the spiral of the reel, they are controlled in their trajectory by having the clippings on the left thrown at a higher elevation than those on the right end of the reel and thus the trailing catcher can be filled to its maximum capacity.

Other objects and advantages will become apparent upon reading the following description in light of the accompanying drawings wherein:

FIG. 1 is a left side perspective view of a catcher and a fragment of the reel type mower employed therewith.

FIG. 2 is a right side perspective of an enlarged fragment of that shown in FIG. 1 and having parts thereof removed and broken away.

FIG. 3 is an enlarged sectional view taken on the lines 4—4 of FIG. 2.

FIG. 1 shows the invention to include the reel type of lawn mower 10 and the grass catcher 11 mounted in a suspended or cantilever position on the rear of the mower 10, and it will be thus seen and understood that the catcher 11 is not supported on the mower handle 12, but rather the catcher is supported in a manner described later. Of course the mower 10 is generally of a conventional type which includes the usual ground wheels, such as the fragment of the shown wheel 13, and the usual rear ground-engaging roller 14, both for supporting the mower on the ground, and the usual engine 16, shown to be of the gasoline type, is employed for powering the mower in the well-known manner. Further, the usual spiral cutting reel 17 is included in the mower and it will here be noted that the reel 17 will rotate in a forward direction which is the same as the direction of rotation of the wheel 13 and it will also be noted that, in this instance, the reel 17 is shown to be spiralled in a direction so that the clippings will be thrown toward the left of the mower with respect to facing the forward direction of mower movement. This of course is common and fundamental in the operation of a reel type of mower, and it is this type of spiral referred to hereinafter. Side plates 18 are included in the mower and constitute a part at least of the frame of the mower and of course support the parts heretofore mentioned.

Thus it will be understood that the engine 16 powers the mower and is employed for driving the wheels 13 and is also employed for rotating the reel 17. The reel blades 19 therefore rotate about the reel center rod 21 and the blades 19 cooperate with the bed knife or cutter bar 22 which presents the cutting edge 23 to the reel blades 19 so that the grass can be cut therebetween in the well-known manner. It will therefore again be seen that the blades 19 are spiralled in a direction such that upon forward rotation of the reel 17, the grass clippings will be thrown to the rear left with respect to the forward direction of movement of the mower. It has long been recognized that because of the excessive accumulation of grass clippings on the left side of a rear mounted catcher, the catcher soon becomes overloaded on the left side while the right side is not completely filled up to its capacity. Also, it will be understood that the particular throwing of the grass clippings is dependent upon the speed of forward movement of the mower and also the speed of the rotation of the reel 17. Thus if the reel is slowly rotating and the mower is only slowly moving forward, then the clippings will fall to the front edge of the catcher 11, for instance. Also, if the mower is rapidly moving forward and the reel is rapidly rotating, then the clippings will be thrown further to the rear, but in both instances of speed, the clippings are of course thrown toward the left, as mentioned.

To meet the problem referred to, the invention herein consists of the provision of a deflector generally designated 24 and disposed immediately behind the reel 17 to engage the cut clippings and to increase the height of their trajectory. Thus it will be seen that the deflector 24 consists of a first portion 26 which extends at an angle of preferably approximately forty-five degrees and which angle is of course greater with respect to the horizontal than is the angle of the upper surface 27 of the cutter bar 22. Also, a rear portion 28 of the deflector 24 depends from the portion 26 and it extends between the bar 22 and a rod 29 which extends between the side plates 18 to form a part of the frame and mower. A clamp member 31 is thus disposed rearwardly of the portion 28 and a fastener or sheet metal screw 32 extends through the member 31 and into the portion 28 while the lower end 33 of the clamp 31 extends adjacent the tie rod 29 to secure the deflector 24 against upward displacement and off the cutter bar 22 beyond the position shown in the drawing.

It will thus be understood that the cutter bar or bed plate 22 is provided with the deflector 24 which presents a first upper surface 34 at a steep angle with respect to the horizontal or the frame of the mower and the bar 22 is also presented with the surface 27 which is at a less steep angle with respect to the horizontal so that the compound angle or angles are provided, and it will be further understood that the deflector 24 extends for approximately the left half of the entire length of the bar 22 and this of course is the half or end toward which the grass clippings are thrown due to the spiral of the reel blades 19. Thus the trajectory of the grass clippings is increased as they engage the deflector surface 34 and are therefore thrown at a higher angle so that they can be thrown further to the rear of the catcher 11, and the left rear corner indicated 35 in FIG. 1 is thus first filled and the clippings will of course fall off or gravitate from the initial pile of clippings in the catcher corner 35 and in this manner the entire catcher can be filled to its maximum capacity.

In order to fully utilize the action of the deflector 24, a rear-mounted catcher 11 is provided and disposed for retaining the clippings mentioned. Thus it will be noted that the side plates 18 each have a roller-supporting bracket 36 attached thereto by means of the bolts 37 and an upstanding bar or bracket 38 is also attached to the plates 18 by means of a bolt 39. The catcher 11 is then suspended over the brackets 38 by means of a carrier more fully shown in said parent application and which includes the two legs 43. Two tie rods 51 are also part of the carrier and are disposed on opposite sides 52 and 53 of the catcher 11 and the rods include the threaded ends 54 and the sockets 56 on the opposite ends thereof. The sockets 56 of course receive the legs 43. It will be further noted that the catcher sides 52 and 53 are provided with reinforcing plates 57 which in turn receive the rotatable pins or members 59, which receive the threaded ends 54 and adjusting nuts 62 are provided before and after the pins 59 on the threaded ends 54 so that the effective length of the tie rods 51 can be altered and thus the angle of the catcher 11 is also variable as desired.

The catcher 11 includes the sides 52 and 53 and the rear wall 67, and it will of course be understood that the bottom 68 extends between the three walls mentioned, and further the entire catcher is of a rigid material, such as rigid plastic or the like so that it can be suspended as described. Thus the catcher can be readily tipped slightly forward and lifted off the brackets 38 and removed from the mower 10 for emptying or the like, and also the catcher can bounce by hitting a bump at the heel or rear end thereof without having it slip off the mower. It will also be understood that when the roller 14 is adjusted vertically in the usual manner through the adjustment of the supporting brackets 36, the angle of the mower 10 will then be altered but the relative angle of the catcher to the mower remains the same until it is desired that the angle of the catcher 11 be altered also and in this instance, the catcher will be altered by adjustment of the carrier rods 51 as described.

FIG. 3 shows that the center of the reel 19 is indicated at C and the blades 17 therefore scribe the circular path indicated by the dotted line B and with the relation described, a line drawn from the center C to the deflector 24, if drawn at a 45 degree plane with respect to the ground level, will form the obtuse angle indicated A and this angle is of course between the 45 degree line described and the upper surface 34 of the deflector 24. Thus the bed knife 22 is provided with two upper or top surfaces 27 and 34 which are at relative angles to each other for the purpose mentioned.

While a specific embodiment of this invention has been shown and described, it will be understood that certain changes could be made therein and the invention therefore should be limited only by the scope of the appended claims.

What is claimed is:

1. In a reel type lawn mower including a rotatable reel and a bed plate disposed in cutting relation with said reel, said bed plate being provided with a first top surface disposed at one angle to said mower, with respect to the horizontal, at only one end of said bed plate and with a second top surface disposed at a second angle to said mower at only the other end of said bed plate and with said second angle being with respect to the horizontal and different from said one angle.

2. In a reel type lawn mower including a rotatable reel and a bed plate disposed in cutting relation with said reel, said bed plate being provided with a first top surface disposed at one angle to said mower, with respect to the horizontal, at only one end of said bed plate and with a second top surface disposed at a second angle to said mower at only the other end of said bed plate and with said second angle being with respect to the horizontal and different from said one angle, and a grass catcher mounted on said mower for receiving grass clippings deflected by said bed plate off of said top surfaces thereof.

3. A reel type lawn mower of the type including a reel and a bed knife which has an upper surface on a continuous level through the length of said bed knife, comprising a deflector extending over only one end of said length of said bed knife and thereabove immediately behind the cutting edge of said bed knife and being angled rearwardly upward with respect to said mower and said upper surface and in the trajectory of said clippings for altering said trajectory, said one end being the end of said length of said bed knife toward which said reel throws grass clippings due to the spiral and the cutting rotation of said reel.

4. A reel type lawn mower and grass catcher combination of the type including a reel and a bed knife and a rear-mounted catcher, comprising a grass deflector mounted on said mower and extending on said bed knife over the upper surface thereof and through only substantially the half thereof toward which said reel throws grass clippings due to the spiral and forward rotation of said reel, said deflector being disposed in the path of said clippings for guiding grass clippings upwardly and rearwardly in a high trajectory, and a grass catcher attached to the rear of said mower and including adjustment means thereon for adjustably attaching said catcher to said mower for angling said catcher relative to said trajectory and the horizontal to effect maximum filling of said catcher.

5. A reel type lawn mower and grass catcher combination of the type including a reel and a bed knife and a rear-mounted catcher, comprising a deflector extending over only one end of said bed knife and thereabove immediately behind the cutting edge of said bed knife and being angled upwardly and rearwardly with respect to said mower and the horizontal and being disposed in the trajectory of said clippings for altering said trajectory, said one end being the end of said bed knife toward which said reel throws grass clippings due to the spiral and the cutting rotation of said reel, and a grass catcher mounted on the rear of said mower, and adjustable mounting means on said catcher and adapted for releasable attachment to said mower for varying the angle of said catcher with respect to the altered trajectory of said clippings and the horizontal.

6. In a reel type lawn mower including a rotatable reel and a bed plate disposed in cutting relation with the reel, the invention comprising a first grass-deflecting surface on the top side of only one end of said bed plate for engaging grass clippings and baffling same upwardly and rearwardly of said mower in a first trajectory, and a second grass deflecting surface on the top side of only the other end of said bed plate and being disposed at an angle relative to said first grass-deflecting surface, with respect to the horizontal, for engaging grass clippings and baffling same upwardly and rearwardly of said mower in a second trajectory at an angle relative to said first trajectory and with respect to the horizontal.

References Cited in the file of this patent

UNITED STATES PATENTS

| | | |
|---|---|---|
| 463,451 | Redel | Nov. 17, 1891 |
| 493,612 | Braun | Mar. 14, 1893 |
| 2,508,060 | Dalglish | May 16, 1950 |
| 2,955,404 | Strasel et al. | Oct. 11, 1960 |
| 2,970,421 | Krewson | Feb. 7, 1961 |